US012235340B2

(12) United States Patent
Tanaka et al.

(10) Patent No.: US 12,235,340 B2
(45) Date of Patent: Feb. 25, 2025

(54) DISTANCE MEASUREMENT DEVICE AND DISTANCE MEASUREMENT METHOD

(71) Applicant: Sony Semiconductor Solutions Corporation, Kanagawa (JP)

(72) Inventors: Masayuki Tanaka, Kanagawa (JP); Hiroaki Nakano, Tokyo (JP); Uichiro Omae, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 430 days.

(21) Appl. No.: 17/634,621

(22) PCT Filed: May 19, 2020

(86) PCT No.: PCT/JP2020/019714
§ 371 (c)(1),
(2) Date: Feb. 11, 2022

(87) PCT Pub. No.: WO2021/033379
PCT Pub. Date: Feb. 25, 2021

(65) Prior Publication Data
US 2022/0291371 A1    Sep. 15, 2022

(30) Foreign Application Priority Data
Aug. 19, 2019   (JP) .................. 2019-149988

(51) Int. Cl.
*G01S 13/28*   (2006.01)
*G01S 7/282*   (2006.01)
(52) U.S. Cl.
CPC ............ *G01S 13/282* (2013.01); *G01S 7/282* (2013.01)
(58) Field of Classification Search
CPC .............................. G01S 13/282; G01S 7/282
See application file for complete search history.

(56) References Cited

U.S. PATENT DOCUMENTS

2010/0159842 A1* 6/2010 Fukagawa ............... G01S 13/76
455/67.11
2016/0381504 A1* 12/2016 Sommer ............... G01S 13/765
455/456.1
(Continued)

FOREIGN PATENT DOCUMENTS

JP   2009287942 A  * 12/2009
JP   2010002266 A    1/2010
(Continued)

OTHER PUBLICATIONS

International Search Report (PCT/ISA/210), International Application No. PCT/JP2020/019714, dated Jul. 13, 2020.

*Primary Examiner* — Vladimir Magloire
*Assistant Examiner* — Noah Yi Min ZHu
(74) *Attorney, Agent, or Firm* — Michael Best & Friedrich LLP

(57) ABSTRACT

Provided are a distance measurement device and a distance measurement method for accurately measuring a distance even when multipath occurs.
The present technology provides a distance measurement device including a first transceiver, a second transceiver, a response information acquisition section, a filter, and a distance calculator. The first transceiver transmits a first pulse signal to the second transceiver while performing frequency sweeping. The second transceiver receives the first pulse signal transmitted from the first transceiver. The response information acquisition section acquires response information on a basis of a phase difference obtained by reception of the first pulse signal. The filter extracts initial response information from the response information, the initial response information being the response information related to the first pulse signal to be received at an initial stage. The distance calculator calculates group delay on a basis of the initial response information, and calculates a (Continued)

distance between the first transceiver and the second transceiver by multiplying the group delay by a light velocity.

10 Claims, 14 Drawing Sheets

(56) References Cited

U.S. PATENT DOCUMENTS

| | | | |
|---|---|---|---|
| 2017/0276772 A1* | 9/2017 | Tokuda | G01S 7/4865 |
| 2018/0267155 A1* | 9/2018 | Shimizu | G01S 17/32 |
| 2018/0270693 A1* | 9/2018 | Fischer | C12Q 1/6874 |

FOREIGN PATENT DOCUMENTS

| | | | | |
|---|---|---|---|---|
| JP | 2012122960 A | * | 6/2012 | |
| JP | 2014132263 A | | 7/2014 | |
| JP | 2014132744 A | * | 7/2014 | ......... H04L 25/0212 |
| JP | 2018510331 A | | 4/2018 | |
| JP | 2018155725 A | | 10/2018 | |

\* cited by examiner

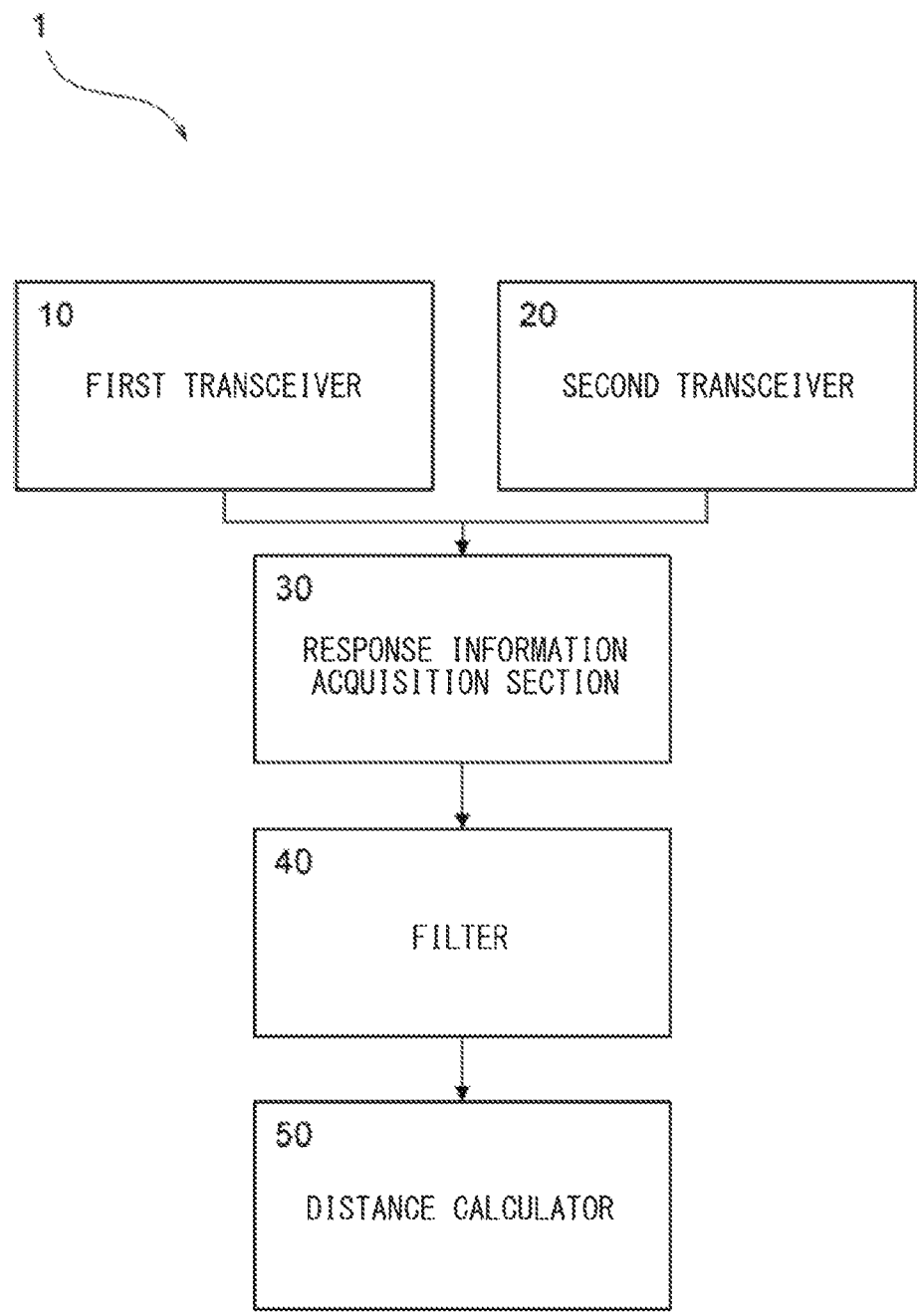

[ FIG. 2 ]
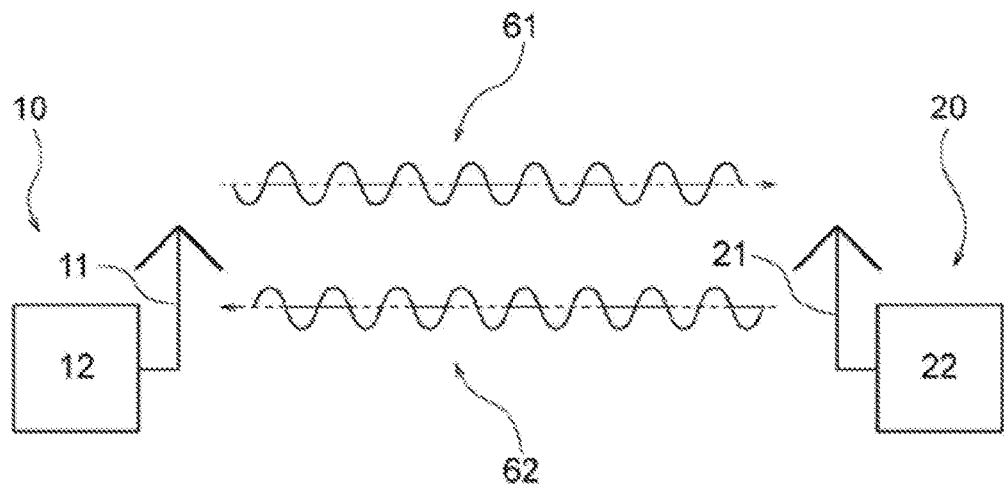
[ FIG. 3 ]
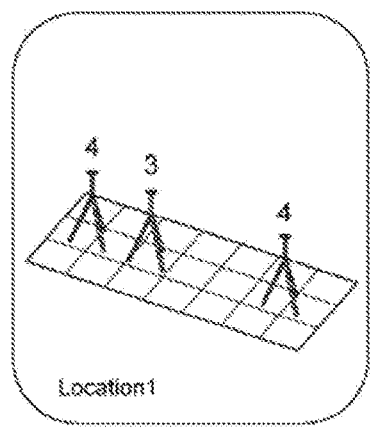
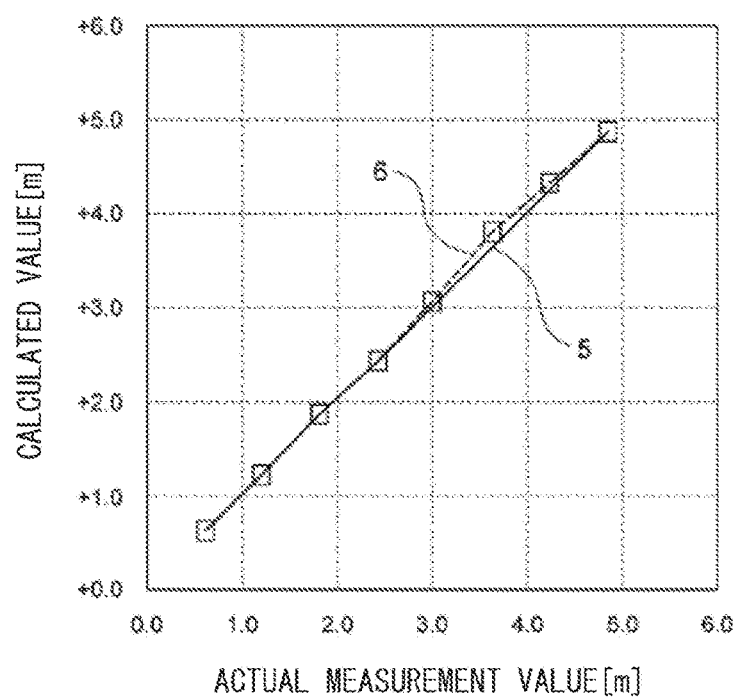

[FIG. 4]
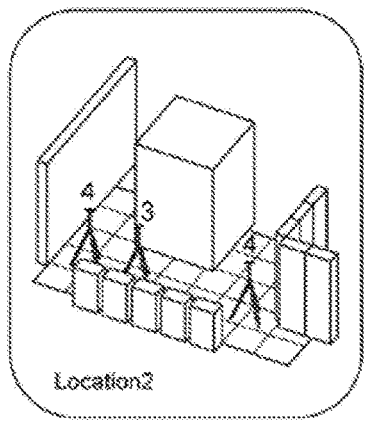
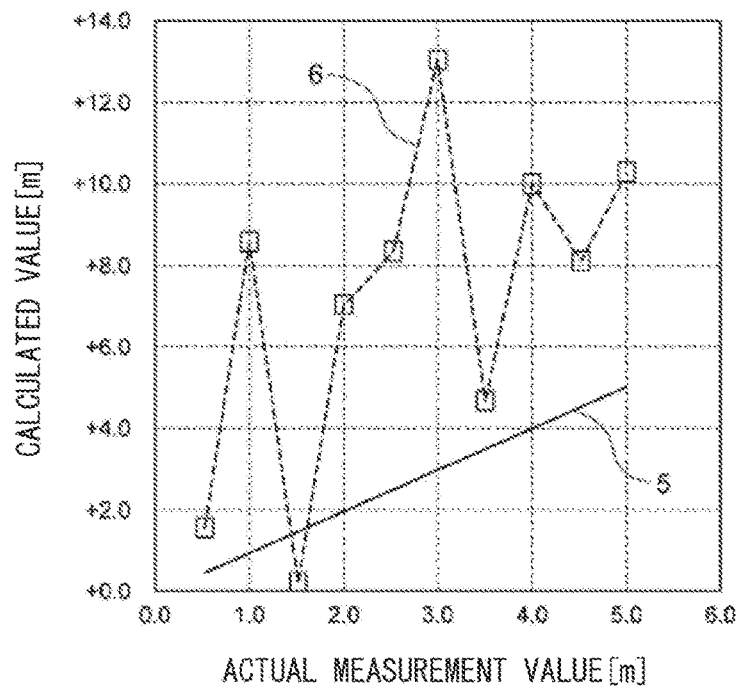
[FIG. 5]
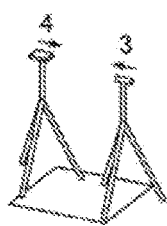 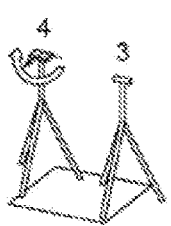 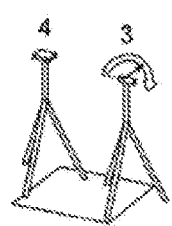 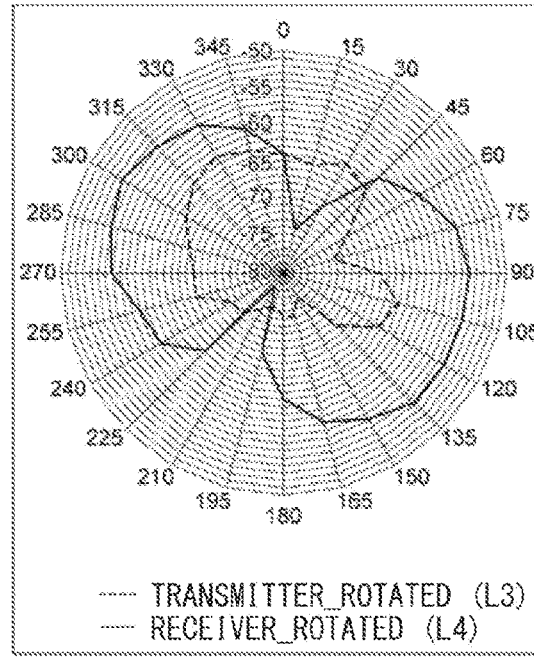
0 DEGREE　　RECEIVER ROTATES BY 90 DEGREES　　TRANSMITTER ROTATES BY 90 DEGREES
---- TRANSMITTER_ROTATED (L3)
---- RECEIVER_ROTATED (L4)

[FIG. 6]
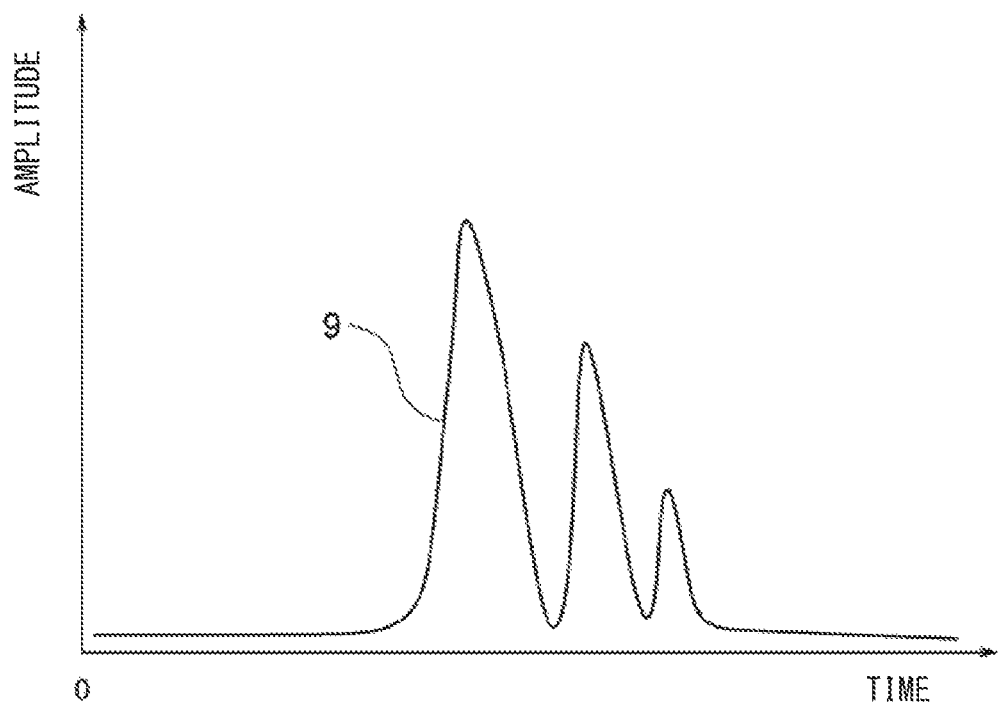

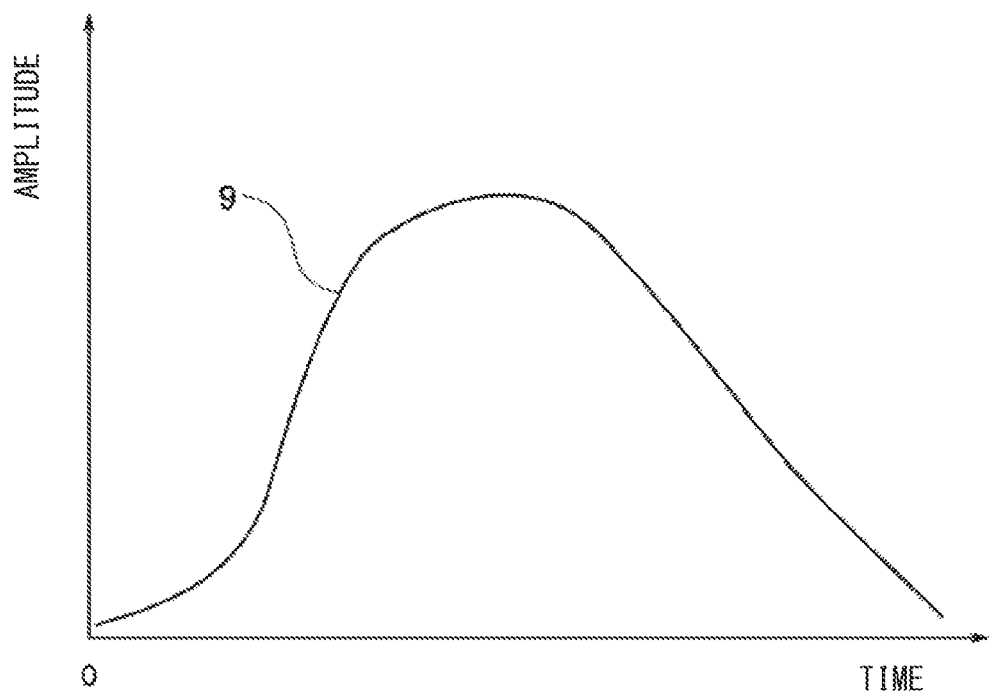

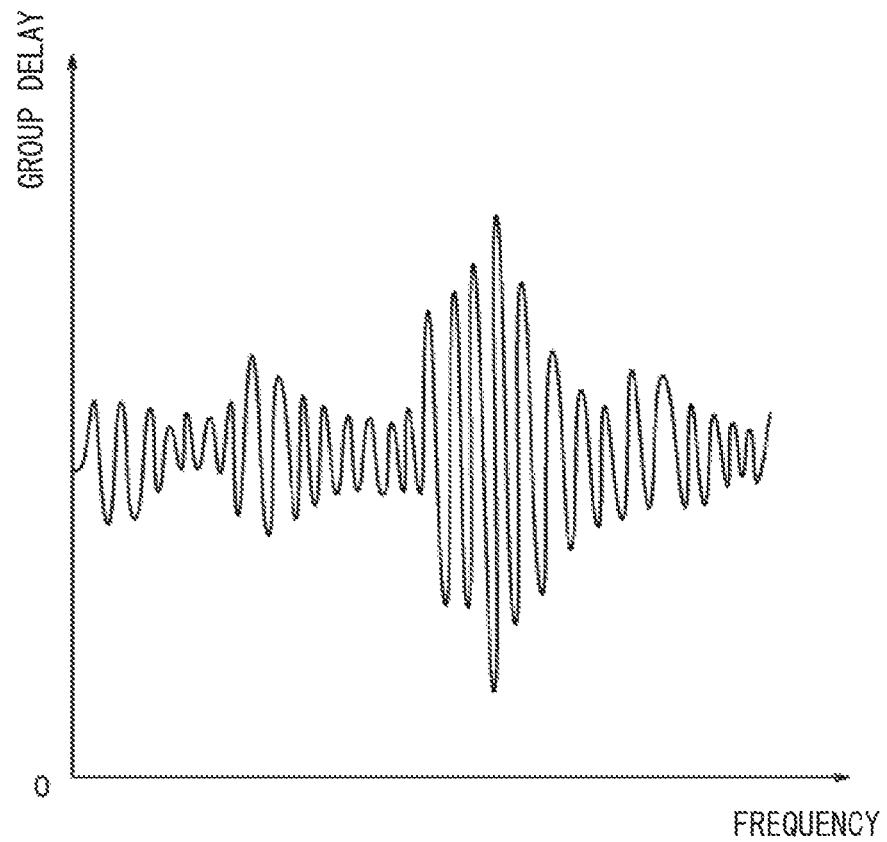
[FIG. 8]

[ FIG. 9 ]
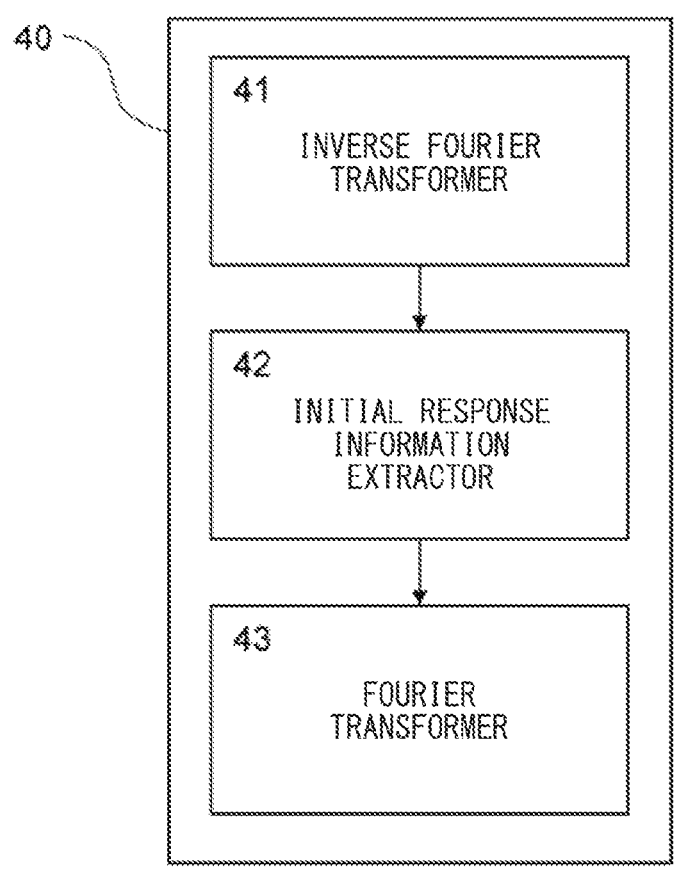

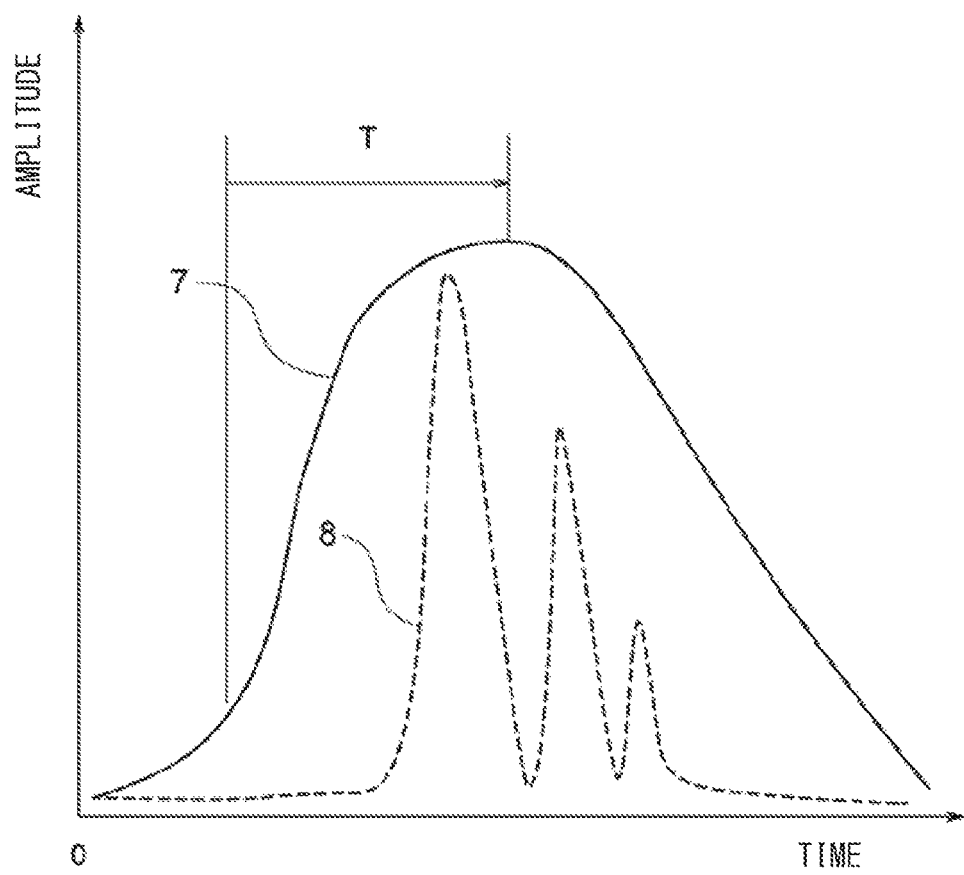
[ FIG. 10 ]

[ FIG. 11 ]
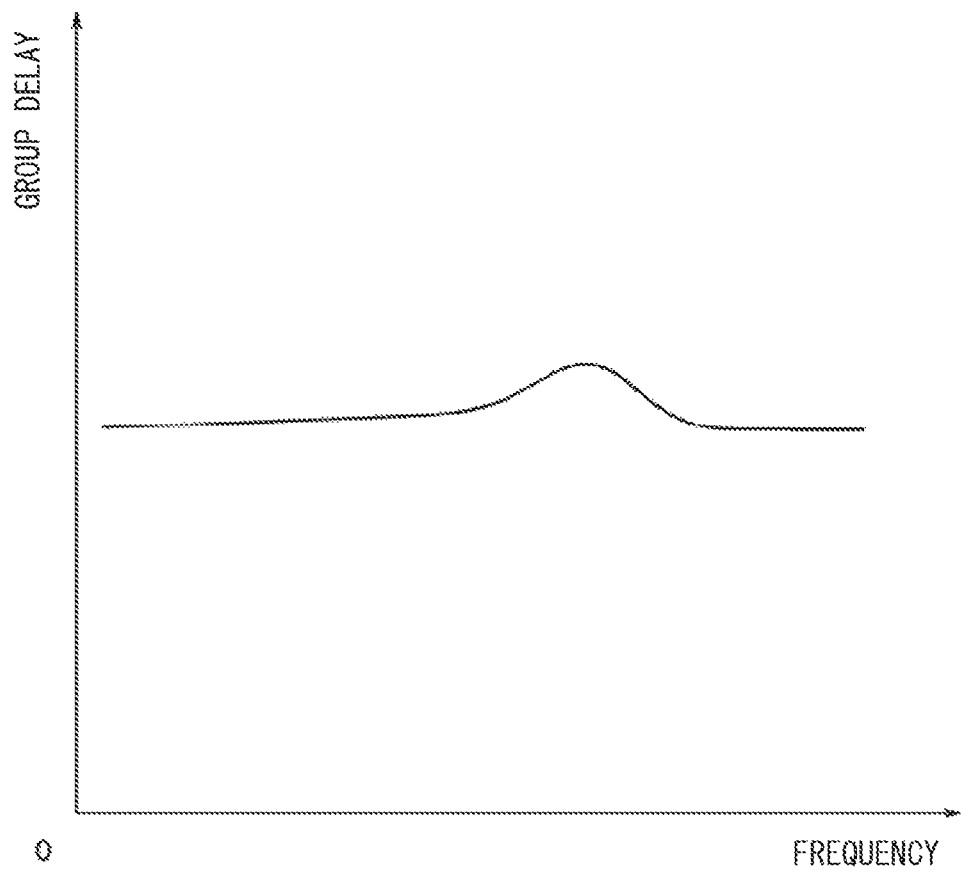

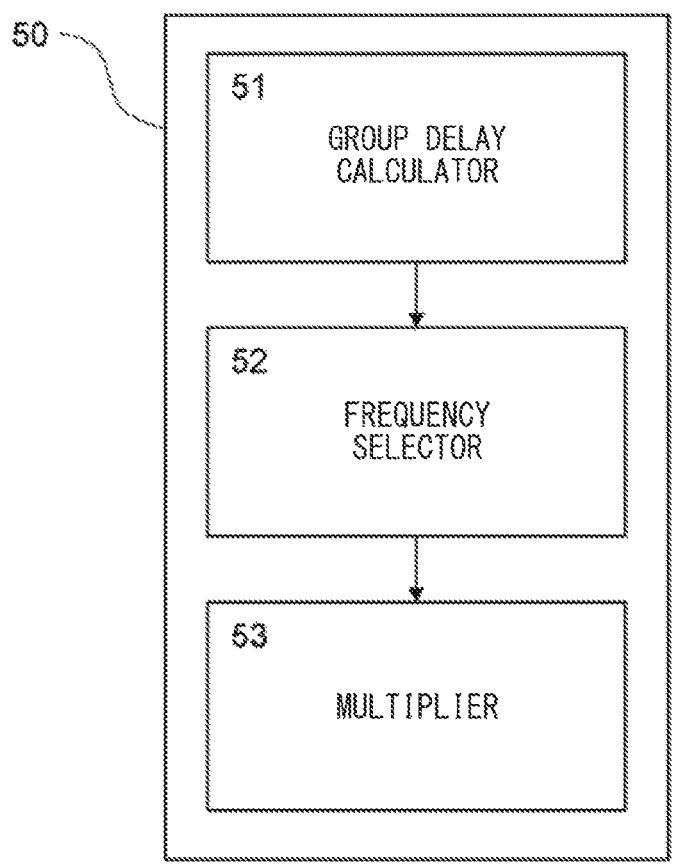
[ FIG. 12 ]

[ FIG. 13 ]
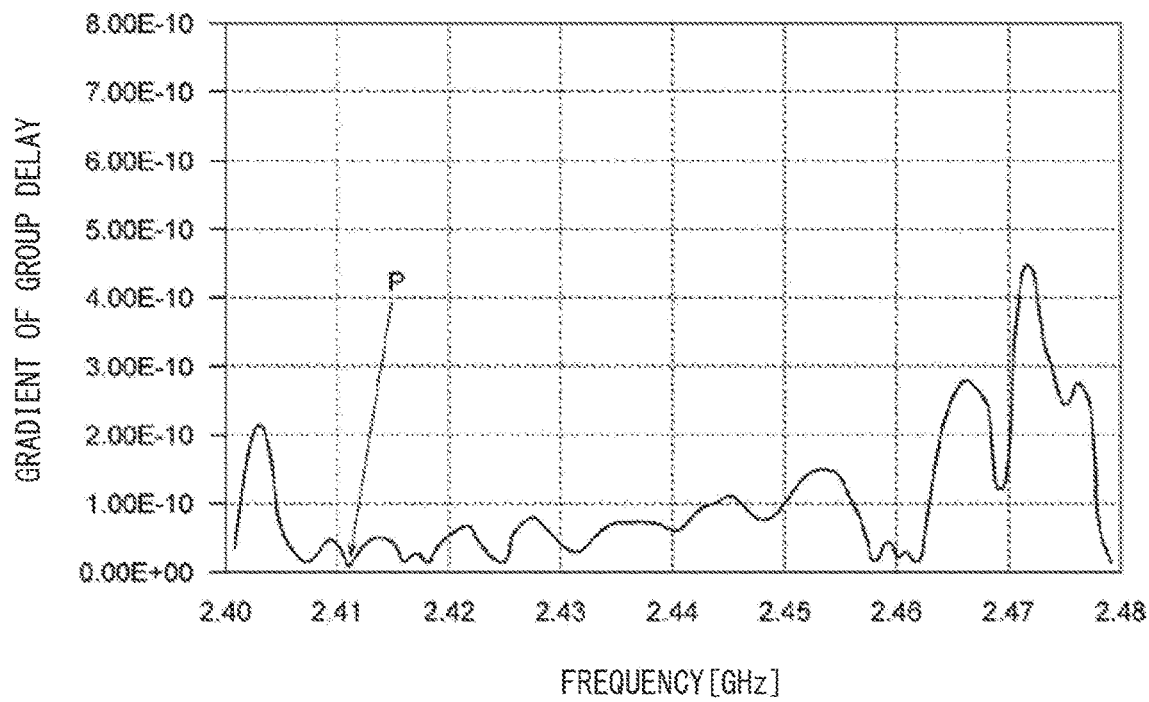
[ FIG. 14 ]
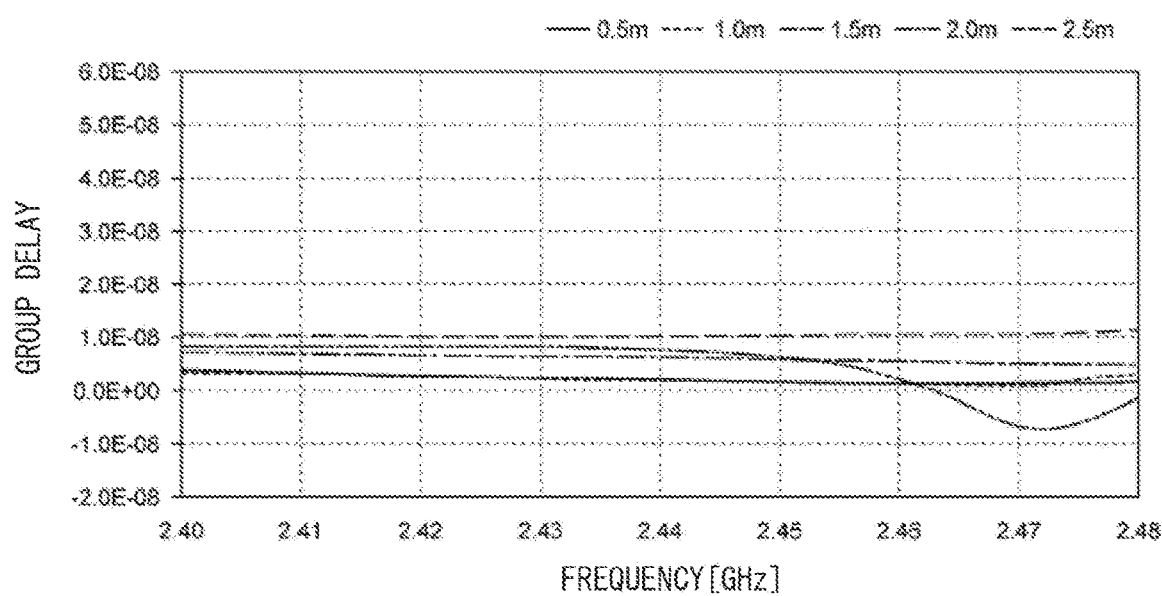

[ FIG. 15 ]
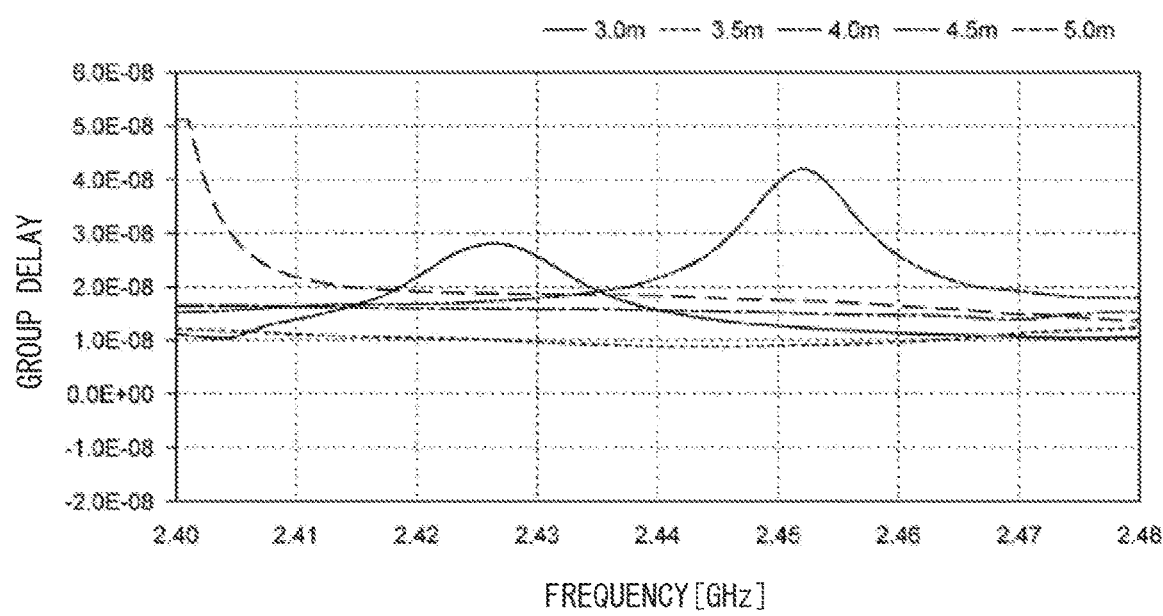

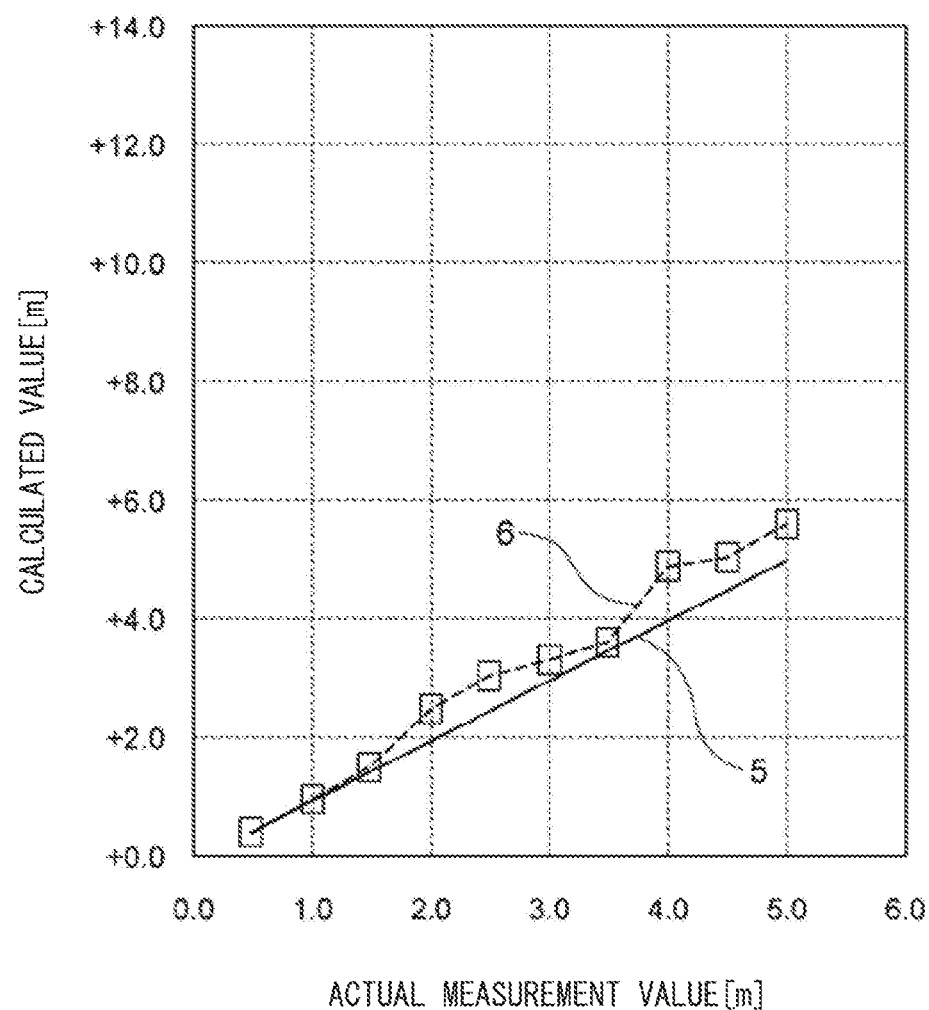

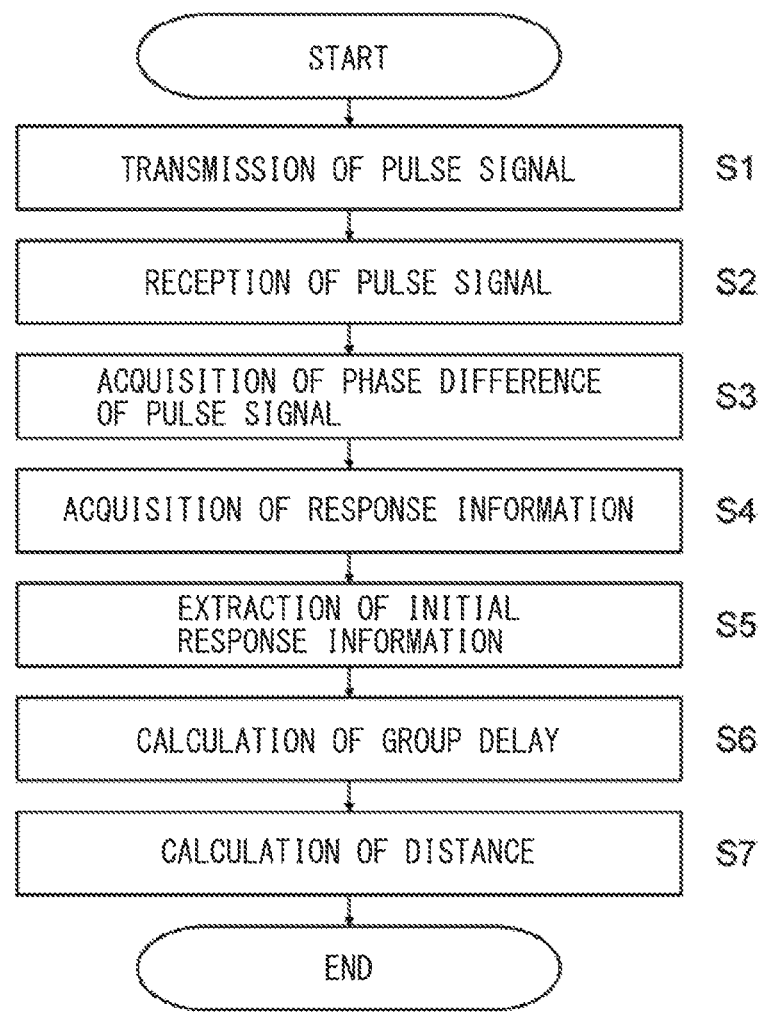
[FIG. 17]

DISTANCE MEASUREMENT DEVICE AND DISTANCE MEASUREMENT METHOD

TECHNICAL FIELD

The present technology relates to a distance measurement device and a distance measurement method.

BACKGROUND ART

There has been an issue that it is difficult to perform indoor positioning or distance measurement using GPS (Global positioning system), because radio waves from GPS satellites are less liable to reach indoors. Accordingly, distance measurement technology using a radio signal, such as Wi-Fi, Bluetooth (registered trademark), or the like has recently been used.

Use of the distance measurement technology enables, for example, indoor navigation, analysis of a route traveled by a customer in a store, and the like.

PTL 1 discloses "a distance measurement device that calculates a distance on the basis of carrier phase detection, the distance measurement device including: a calculation section for calculating the distance between a first device and a second device at least one of which is movable, on the basis of phase information obtained by the first device and the second device; the first device including a first reference signal source and a first transmitter-receiver for transmitting three or more first carrier signals using the output of the first reference signal source and receiving three or more second carrier signals; the second device including a second reference signal source that operates independently of the first reference signal source and a second transmitter-receiver for transmitting three or more second carrier signals using the output of the second reference signal source and receiving the three or more first carrier signals, the calculation section calculating the distance on the basis of the phase detection result obtained by reception of the first and second carrier signals, and correcting the calculated distance on the basis of information pertaining to the amplitude ratio of one of the first carrier signals to the other that have been received by the second transmitter-receiver". PTL 1 describes the distance measurement device that makes it possible to calculate an accurate distance by employing communication-type distance measurement that determines a distance between two devices on the basis of communication between the two devices.

PTL 2 discloses "a wireless distance measurement system having a base station apparatus and a wireless communication terminal apparatus, the base station apparatus including: a transmitting section that generates a pulse based on a clock and transmits the generated pulse; a receiving section that receives the transmitted pulse via the wireless communication terminal apparatus; a phase shifting section that generates a plurality of phase shifted clocks obtained by shifting a phase of the clock using a transportation amount that is narrower than a width of the pulse; an analog to digital conversion section that converts the received pulse to a digital signal at a plurality of phases using the plurality of phase shifted clocks; a correlation calculation section that performs correlation calculation between the pulse converted to the digital signal and the pulse as transmitted from the transmitting section, and forms a delay profile by adding correlation values between same phases; a detection section that detects an incoming wave from the wireless communication terminal apparatus based on peaks of pulses in the delay profile; and a distance calculation section that calculates a distance to the wireless communication terminal apparatus using an elapsed time after the pulse is transmitted from the transmitting section until the detected incoming wave is received in the receiving section, and a circuit delay time uniformly determined by the wireless communication terminal apparatus and a circuit delay time uniformly determined by the base station, which are advance calibration data, the wireless communication terminal apparatus including: a transmission/reception section that receives a pulse transmitted from the base station apparatus; a first amplification section that amplifies the received pulse; a detection section that performs envelope detection on a received pulse that is amplified by the first amplification section and has a predetermined period; a comparator that binarize the detection result obtained by the detection section; a masking section that masks the binarized detection result using an edge mask that is started and terminated in accordance with the binarized detection result; a pulse generation section that generates a pulse in accordance with the masked binarized detection result; and a bandpass filter that limits a band of the generated pulse, the transmission/reception section reradiating the band-limited pulse to the base station apparatus, the detection section detecting, after detecting a pulse transmitted from the base station apparatus within the predetermined period, the pulse reradiated from an antenna of the wireless communication terminal apparatus, the edge mask being started by, of the binarized detection result, a binarized detection result of the pulse transmitted by the base station apparatus and being terminated by, of the binarized detection result, a binarized detection result of the pulse reradiated from the antenna of the wireless communication terminal apparatus". PTL 2 describes the wireless distance measurement system that is able to measure a distance between a base station and a terminal without necessitating clock synchronization between a plurality of base stations and input of positional relationship between the base stations.

PTL 3 discloses "a wireless communication system that performs distance measurement on the basis of a delay time in data transmission and reception between wireless communication apparatuses in half-duplex communication, the wireless communication system including, where the wireless communication apparatus performing the distance measurement is referred to as a measuring station and the wireless communication apparatus on which the distance measurement is to be performed is referred to as a measured station: a modulation signal generation/transmission section that generates and transmits a short time modulation signal at a symbol switching point pulse indicating a length of the symbol in the measuring station; a demodulation section that extracts the symbol switching point pulse from the received short time modulation signal in the measuring station and the measured station; a clock synchronization section that synchronizes a clock phase with the measuring station using the symbol switching point pulse and causes the clock to be stored; a measuring-station-unique-word transmission section that transmits a unique word including time information in the measuring station; a unique-word detection section that detects the unique word on a basis of a received signal in the measuring station and the measured station; a measured-station-unique-word transmission section that transmits back the unique word after waiting a fixed delay time using the synchronized clock in the measured station; and a distance calculation section that counts, during a period from transmission of the unique word to reception of the unique word transmitted by the measured station, clocks for measurement, and subtracts the fixed delay of the unique word from the count value to calculate a distance between the measuring station and the measured station." PTL 3 describes the wireless communication apparatus that performs accurate distance measurement on the basis of the measurement of propagation delay time, in the half-duplex communication system, by performing storing of the clock phase using the symbol switching point pulse in the measured station, and transmitting back the unique word including the fixed delay.

CITATION LIST

Patent Literature

PTL 1: Japanese Unexamined Patent Application Publication No. 2018-155725
PTL 2: Japanese Unexamined Patent Application Publication No. 2010-002266
PTL 3: Japanese Unexamined Patent Application Publication No. 2014-132263

SUMMARY OF THE INVENTION

Problems to be Solved by the Invention

However, there is an issue that multipath easily occurs indoors. The multipath means receiving a radio signal through a plurality of paths due to reflection or refraction of the radio signal. The multipath may cause noise, or may cause interference between radio signals, for example.

Although the techniques disclosed in PTLs 1 to 3 are helpful for improving distance measurement performance, no countermeasure is suggested against the multipath.

Accordingly, it is desirable that the present technology provide a distance measurement device and a distance measurement method for accurately measuring a distance even when multipath occurs.

Means for Solving the Problems

The present technology provides a distance measurement device including a first transceiver, second transceiver, a response information acquisition section, a filter, and a distance calculator, in which the first transceiver transmits a first pulse signal to the second transceiver while performing frequency sweeping, the second transceiver receives the first pulse signal transmitted from the first transceiver, the response information acquisition section acquires response information on a basis of a phase difference obtained by reception of the first pulse signal, the filter extracts initial response information from the response information, the initial response information being the response information related to the first pulse signal to be received at an initial stage, and the distance calculator calculates group delay on a basis of the initial response information, and calculates a distance between the first transceiver and the second transceiver by multiplying the group delay by a light velocity.

The first transceiver may transmit the first pulse signal to the second transceiver. The second transceiver may receive the first pulse signal transmitted by the first transceiver, and may transmit the second pulse signal to the first transceiver. The first transceiver may receive the second pulse signal transmitted by the second transceiver. The response information acquisition section may acquire the response information on a basis of a phase difference obtained by reception of the first pulse signal and/or the second pulse signal. The filter may extract initial response information from the response information, the initial response information being the response information related to the first pulse signal and/or the second pulse signal to be received at the initial stage. The distance calculator may calculate the group delay on the basis of the initial response information, and may calculate the distance by multiplying the group delay by the light velocity.

The second transceiver may generate the second pulse signal by adding, to the first pulse signal, a difference between a phase of the first pulse signal based on a timing of transmission and a phase of the first pulse signal based on a timing of reception.

The first pulse signal and the second pulse signal may each have a narrow frequency bandwidth.

The first pulse signal and the second pulse signal may each have a frequency bandwidth of lower than or equal to 160 MHz.

The filter may include an inverse Fourier transformer, an initial response information extractor, and a Fourier transformer. The inverse Fourier transformer may transform the response information from frequency domain information to time domain information. The initial response information extractor may extract the initial response information from the response information that has been transformed to the time domain information. The Fourier transformer may transform the initial response information from the time domain information to the frequency domain information.

The initial response information may be the response information related to the first pulse signal and/or the second pulse signal to be received first.

The distance calculator may include a group delay calculator, a frequency selector, and a multiplier. The group delay calculator may calculate a gradient of group delay on a basis of the initial response information. The frequency selector may select a frequency on a basis of the gradient of the group delay. The multiplier may calculate the distance by multiplying the group delay at the frequency by the light velocity.

The frequency selector may select a frequency at which the gradient of the group delay is minimum.

Further, the present technology provides a distance measurement method including: transmitting a pulse signal while performing frequency sweeping; receiving the pulse signal; acquiring a phase difference of the pulse signal; acquiring response information on a basis of the phase difference; extracting initial response information from the response information, the initial response information being the response information related to the first pulse signal to be received at an initial stage; calculating group delay on a basis of the initial response information; and calculating a distance by multiplying the group delay by a light velocity.

BRIEF DESCRIPTION OF DRAWINGS

FIG. 1 is a configuration diagram of a distance measurement device according to an embodiment of the present technology.

FIG. 2 is a schematic diagram for describing operation of a first transceiver and a second transceiver according to an embodiment of the present technology.

FIG. 3 is a diagram for describing a case where an influence of multipath on distance measurement performance is small.

FIG. 4 is a diagram for describing a case where the influence of the multipath on the distance measurement performance is large.

FIG. 5 is a diagram for describing an influence of orientations of antennas on the distance measurement performance.

FIG. 6 illustrates an example of a response characteristic in a TOA method.

FIG. 7 illustrates an example of a response characteristic in the TOA method.

FIG. 8 illustrates an example of response information according to an embodiment of the present technology.

FIG. 9 is a configuration diagram of a filter according to an embodiment of the present technology.

FIG. 10 illustrates an example of response information according to an embodiment of the present technology.

FIG. 11 illustrates an example of initial response information according to an embodiment of the present technology.

FIG. 12 is a configuration diagram of a distance calculator according to an embodiment of the present technology.

FIG. 13 illustrates an example of a gradient characteristic of group delay according to an embodiment of the present technology.

FIG. 14 illustrates examples of results of group delay calculated by a group delay calculator according to an embodiment of the present technology.

FIG. 15 illustrates examples of results of group delay calculated by the group delay calculator according to an embodiment of the present technology.

FIG. 16 illustrates an example of a result of distance measurement result obtained by the distance measurement device according to an embodiment of the present technology.

FIG. 17 illustrates an example of a flowchart of a distance measurement method according to an embodiment of the present technology.

MODES FOR CARRYING OUT THE INVENTION

The following describes preferred embodiments of the present technology with reference to the drawings. It is to be noted that the following embodiments and examples to be described below are specific examples of embodiments and examples of the present technology, and the present technology is not limited thereto. It is to be noted that description is given in the following order.
1. Outline of Present Technology
2. First Embodiment of Present Technology (Distance Measurement Device)
3. Second Embodiment of Present Technology (Distance Measurement Method)

1. Outline of Present Technology

Various distance measurement techniques are currently being studied. Examples thereof include pedestrian dead reckoning (PDR) which measures an amount of movement of a user, a positioning method which performs matching against geomagnetic data or the like, a time of flight (TOF) method which measures a distance on the basis of a flight time of light.

However, the pedestrian dead reckoning has an issue in that errors acquired from an acceleration sensor, a gyro sensor, etc. are accumulated and it is not possible to correct the errors. The positioning method which performs matching against geomagnetic data or the like has an issue in terms of operation that it is necessary to create a map in advance and to recreate matching data when the map, a layout, or the like is changed. The TOF method has an issue in that distance measurement performance decreases due to shadowing which is obstructed by a person on a line of sight.

In order to solve these issues, distance measurement technology using a radio signal is used. A distance measurement method using the radio signal has an advantage that it does not have to create a map in advance.

A function of performing communication using a radio signal such as Wi-Fi, Bluetooth (registered trademark), LTE (Long Term Evolution), or the like is currently included in a mobile terminal such as a smartphone. Accordingly, it can be said that it is an environment suitable for using the radio signal.

It is possible to achieve the distance measurement method using the radio signal by a program or the like. It is possible to build the program in the mobile terminal.

FIG. 1 is a configuration diagram of a distance measurement device according to an embodiment of the present technology. As illustrated in FIG. 1, a distance measurement device 1 according to an embodiment of the present technology includes a first transceiver 10, a second transceiver 20, a response information acquisition section 30, a filter 40, and a distance calculator 50.

The first transceiver 10 and the second transceiver 20 each transmit and receive a pulse signal. On the basis of a phase difference between the transmitted pulse signal and the received pulse signal, the distance measurement device 1 calculates a distance between the first transceiver 10 and the second transceiver 20.

FIG. 2 is a schematic diagram for describing operation of the first transceiver 10 and the second transceiver 20. As illustrated in FIG. 2, the first transceiver 10 and the second transceiver 20 are spaced apart by a predetermined distance.

The first transceiver 10 includes a first antenna 11 and a first processor 12. The second transceiver 20 includes a second antenna 21 and a second processor 22.

The first antenna 11 and the second antenna 21 each transmit and receive a radio pulse signal. The first processor 12 and the second processor 22 each process the radio pulse signal.

The first transceiver 10 transmits, via the first antenna 11 and the second antenna 21, a first pulse signal 61 to the second transceiver 20 while performing frequency sweeping. The distance measurement device 1 performs measurement (frequency sweeping) using a plurality of different frequencies in an appropriate range (measurement range) of a certain degree.

The first pulse signal 61 arrives at the second transceiver 20 with a predetermined delay time. That is, the first pulse signal 61 arrives at the second transceiver 20 with a phase difference obtained by multiplying the delay time by a transmission angular frequency.

The second transceiver 20 receives the first pulse signal 61 transmitted from the first transceiver 10.

The second processor 22 generates a second pulse signal 62 by adding the phase difference to the first pulse signal 61. The phase difference is a difference between a phase of the first pulse signal 61 based on a timing of transmission and a phase of the first pulse signal 61 based on a timing of reception.

The second transceiver 20 transmits, via the second antenna 21 and the first antenna 11, the second pulse signal 62 to the first transceiver 10 while performing frequency sweeping.

The first transceiver 10 receives the second pulse signal 62 transmitted from the second transceiver 20.

In this way, the distance measurement device 1 reflects radio pulse signal in a pseudo manner.

In this embodiment, the distance measurement device 1 includes two transceivers 10 and 20, but may include three or more transceivers, or may include one transceiver.

In a case where the distance measurement device 1 includes one transceiver, an object reflects a radio pulse signal transmitted from one transceiver. The transceiver receives the reflected radio pulse signal.

In this case, however, strength of the reflected radio pulse signal is weakened; thus, it is difficult to detect the radio pulse signal. Accordingly, it is desirable that the distance measurement device 1 include at least two transceivers.

Incidentally, the distance measurement device 1 is mainly used indoors, and as mentioned above, there is an issue that multipath easily occurs indoors.

Referring to FIGS. 3 and 4, an influence of multipath on distance measurement performance will now be described. FIG. 3 is a diagram for describing a case where the influence of the multipath on the distance measurement performance is small. FIG. 4 is a diagram for describing a case where the influence of the multipath on the distance measurement performance is large.

A left-hand diagram of FIG. 3 illustrates an environment in which a transmitter 3 and a receiver 4 of a radio pulse signal are disposed. Around the transmitter 3 and the receiver 4, no object that reflects the radio pulse signal is disposed. Thus, it is unlikely that the multipath will occur.

A right-hand diagram of FIG. 3 illustrates results of distance measurement performed by the transmitter 3 and the receiver 4. A distance between the transmitter 3 and the receiver 4 is varied to evaluate a distance to be calculated. A horizontal axis represents a value obtained by actually measuring the distance between the transmitter 3 and the receiver 4. A vertical axis represents a value obtained by calculating the distance by analyzing the radio pulse signal.

A straight line 5 represents a value obtained by actually measuring the distance, which is a correct value. In the straight line 5, the value of the horizontal axis and the value of the vertical axis are the same.

A polygonal line 6 represents a value obtained by calculating the distance by analyzing the radio pulse signal. The polygonal line 6 and the straight line 5 are nearly overlapping with each other. It is appreciated that the distance measurement performance is high.

In contrast, in a left-hand diagram of FIG. 4, objects that reflect the radio pulse signal are disposed around the transmitter 3 and the receiver 4. Thus, it is likely that the multipath will occur.

In a right-hand diagram of FIG. 4, the polygonal line 6 and the straight line 5 deviate from each other. It is appreciated that the distance measurement performance is lowered by the influence of the multipath.

There is a high possibility that an object that reflects the radio pulse signal is disposed indoors, and there is a high possibility that multipath occurs. Accordingly, it is desirable to reduce the influence of the multipath and improve the distance measurement performance.

Incidentally, there is also a distance measurement method using received signal strength indication (RSSI) which is also known to be susceptible to the multipath. This method takes advantage of a radio wave characteristic that a strength of radio waves and a distance are correlated. In this method, it is estimated, for example, that the distance is short if the received signal strength indication is large, and that the distance is long if the received signal strength indication is small.

In the method using the received signal strength indication, it is known that orientations of respective antennas included in the transmitter 3 and the receiver 4 influence the distance measurement performance. Referring to FIG. 5, the influence of the orientations of the antennas on the distance measurement performance will be described. FIG. 5 is a diagram for describing the influence of the orientations of the antennas on the distance measurement performance.

A left-hand diagram of FIG. 5 illustrates the orientations of the respective antennas included in the transmitter 3 and the receiver 4. In order from the left-hand side, a view in which the transmitter 3 and the receiver 4 are opposed to each other, a view in which the receiver 4 is rotated clockwise by 90 degrees, and a view in which the transmitter 3 is rotated clockwise by 90 degrees are illustrated.

A right-hand diagram of FIG. 5 illustrates results of distance measurement performed by the transmitter 3 and the receiver 4.

In FIG. 5, values of 0 to 345 degrees attached to an outer side of a circle indicate clockwise rotational angles of the transmitter 3 and the receiver 4. Values of −80 to −50 [dB] attached from the center of the circle toward the outer side indicate the received signal strength indication.

A polygonal line 6 represents the received signal strength indication when the receiver 4 rotates clockwise. A polygonal line 6 represents the received signal strength indication when the transmitter 3 rotates clockwise. Depending on the angles of the receiver 4 and the transmitter 3, the received signal strength indication differs by 10 to 20 [dB].

As illustrated in FIG. 5, the orientations of the respective antennas of the transmitter 3 and the receiver 4 influence the distance measurement performance and cause an error. Accordingly, it is desirable to reduce the influence of the orientations of the antennas and improve the distance measurement performance.

In order to solve these issues, various distance measurement methods are currently proposed. Examples thereof include an AOA (Angle of Arrival) method, a TOA (Time of Arrival) method, and a phase difference detection method.

The AOA method is a method of performing positioning using a plurality of directional antennas. This is a method in which, when a receiver receives a radio signal from a transmitter, a position of the transmitter is estimated by measuring an angle at which the radio signal arrives, for example.

The AOA method is able to improve non-uniformity of a radiation characteristic of the antenna. However, the AOA method has an issue in that an installation cost is high for reasons such as demand for changing directivity of the antenna depending on a location. In addition, the AOA method has an issue that it is not possible to respond to a case where the location varies.

The TOA method is a method of estimating a position on the basis of a propagation time of a radio signal. The TOA method is a method of estimating a distance by multiplying the propagation time of the radio signal by a velocity of the radio signal.

The TOA method is useful in a case of using a radio signal having a wide frequency bandwidth such as ultra wideband radio communication (UWB), because the radio signal has high resolution and it is possible to easily remove the multipath.

FIG. 6 illustrates an example of a response characteristic related to a radio signal having a wide frequency bandwidth in the TOA method. In FIG. 6, a horizontal axis represents time and a vertical axis represents amplitude.

As illustrated in FIG. 6, the amplitude increases in three time periods. In each of the three time periods, it is indicated that the radio signal has reached the receiver. It is presumed that the radio signal in the first arrived time period (the time period on the left side in FIG. 6 among the three time periods in which amplitude increases) has the shortest delay time and is correct, and the radio signal in the other time periods (the respective time periods on the middle and the right side in FIG. 6 among the three time periods in which amplitude increases) is affected by multipath. Accordingly, by removing a characteristic of the radio signal affected by multipath, the distance measurement device is able to calculate a distance with high accuracy.

The radio signal having a wide frequency bandwidth has high resolution, and it is thus possible to easily remove the multipath. In contrast, there is an issue that a radio signal having a narrow frequency bandwidth has low resolution and it is thus difficult to remove the multipath. Examples of the radio signal having a narrow frequency bandwidth include BLE (Bluetooth (registered trademark) Low Energy) having a maximum frequency of about 80 MHz, and LTE-Advanced having a maximum frequency of about 160 MHz.

FIG. 7 illustrates an example of a response characteristic related to a radio signal having a narrow frequency bandwidth in the TOA method. In FIG. 7, a horizontal axis represents time and a vertical axis represents amplitude.

As illustrated in FIG. 7, the example has a waveform in which a plurality of signals are mixed. This is because the radio signal has low resolution. Accordingly, it is difficult to remove the characteristic of the radio signal affected by multipath.

The present technology employs the phase difference detection method. The phase difference detection method is a method of calculating a distance on the basis of a phase difference between a transmitted signal and a received signal.

2. First Embodiment of Present Technology (Distance Measurement Device)

A distance measurement device according to an embodiment of the present technology will be described. The distance measurement device 1 calculates a distance between the first transceiver 10 and the second transceiver 20 on the basis of the difference (phase difference) between the phase of the first pulse signal 61 transmitted by the first transceiver 10 and the phase of the first pulse signal 61 received by the second transceiver 20.

A distance measurement method will be described in detail. Differentiating the phase difference with respect to an angular frequency gives group delay. The group delay indicates a differential characteristic of the phase at the frequency. The group delay indicates a gradient of the phase with respect to the angular frequency.

Multiplying the group delay by a light velocity (about 3×108 [m/s]) gives the distance between the first transceiver 10 and the second transceiver 20.

Further, the present technology may utilize group delay that occurs in a round trip of the pulse signal. That is, an average value of the group delay caused by the transmission and reception of the first pulse signal 61 and the group delay caused by the transmission and reception of the second pulse signal 62 may be used. The use of the average value reduces a bias of a distance measurement result and improves the distance measurement performance.

A frequency of the first pulse signal 61 and a frequency of the second pulse signal 62 each vary at a predetermined rate. The first pulse signal 61 and the second pulse signal 62 each vary, for example, from a low frequency to a higher frequency, at a predetermined rate.

On the basis of a phase difference obtained from reception of the first pulse signal 61 and/or the second pulse signal 62, the response information acquisition section 30 acquires response information. The response information is information obtained by analyzing the received first pulse signal 61 and/or the received second pulse signal 62. It is possible to achieve the response information acquisition section 30 by using, for example, a program.

FIG. 8 illustrates an example of the response information. In FIG. 8, a horizontal axis represents a frequency and a vertical axis represents group delay. By varying the frequency, the distance measurement device 1 analyzes the group delay for each frequency.

If no noise or the like is generated, the group delay generally tends to be uniform regardless of frequency. However, as illustrated in FIG. 8, the group delay is not uniform. That is, the group delay differs depending on frequency. Thus, it is highly likely that noise is generated by occurrence of the multipath. It is therefore desirable to remove the multipath.

As described above, the radio signal having a wide frequency bandwidth has high resolution, and it is thus possible to easily remove the multipath. In contrast, the radio signal having a narrow frequency bandwidth has low resolution, and there is thus an issue that it is difficult to remove the multipath.

However, at present, IC chips using a communication standard such as BLE or LTE-Advanced which is a radio signal having a narrow band frequency bandwidth, are built in many mobile terminals. Accordingly, it is desirable to perform positioning using a radio signal having a narrow frequency bandwidth.

The distance measurement device 1 according to an embodiment of the present technology uses a radio signal having a narrow frequency bandwidth. That is, the first pulse signal 61 and the second pulse signal 62 each have a narrow frequency bandwidth. In particular, the frequency bandwidth of each of the first pulse signal 61 and the second pulse signal 62 is lower than or equal to 160 MHz.

The distance measurement device 1 includes the filter 40 that removes the multipath.

The filter 40 extracts initial response information from the response information. The initial response information is response information related to the first pulse signal 61 or the second pulse signal 62 to be received at an initial stage by the first transceiver 10 or the second transceiver 20. The initial response information may also be response information related to the first pulse signal 61 or the second pulse signal 62 to be received first. It is highly probable that the initial response information is not the multipath.

FIG. 9 is a configuration diagram of the filter 40 according to one embodiment. As illustrated in FIG. 9, the filter 40 includes an inverse Fourier transformer 41, an initial response information extractor 42, and a Fourier transformer 43. It is possible to achieve the filter 40 by using, for example, a program.

The inverse Fourier transformer 41 performs an inverse Fourier transformation on the response information to transform the response information from frequency domain information to time domain information.

FIG. 10 illustrates response information obtained by the transformation performed by the inverse Fourier transformer

41 on the response information illustrated in FIG. 8. In FIG. 10, a horizontal axis represents time, and a vertical axis represents amplitude.

A time response characteristic 7 indicated by a solid line is a time response characteristic related to a pulse signal having a narrow frequency bandwidth. The time response characteristic 7 indicated by the solid line is obtained by transforming, by the inverse Fourier transformer 41, the response information.

In contrast, a time response characteristic 8 indicated by a dashed line is a time response characteristic related to a pulse signal having a wide frequency bandwidth. The time response characteristic 8 indicated by the dashed line is not included in the response information. The time response characteristic 8 indicated by the dashed line is given for the purposes of the following explanation.

The initial response information extractor 42 extracts the initial response information from the response information that has been transformed to the time domain information. In FIG. 10, the time response characteristic 7 indicated by the solid line is the response information. The response information within a range of a time period T is the initial response information.

Focusing on the time response characteristic 8 indicated by the dashed line, the amplitude increases in the three time periods. In each of the three time periods, it is indicated that the radio signal has reached the receiver. It is presumed that the first arrived radio signal has the shortest delay time and is correct, and the radio signal in other time period is affected by multipath. Accordingly, by removing a characteristic of the radio signal affected by multipath, the distance measurement device 1 is able to calculate a distance with high accuracy.

The initial response information is response information corresponding to the first arrived signal. Accordingly, extraction of the initial response information makes it possible for the distance measurement device 1 to accurately calculate the distance. It is possible to achieve the extraction by using, for example, a gating technique.

A method of calculating the time period T is not particularly limited. For example, a plurality of patterns in which a narrow band time response characteristic and a wide band time response characteristic are associated with each other may be registered in advance. The initial response information extractor 42 may perform matching of the narrow band time response characteristic included in the response information against the narrow band time response characteristic included in the pattern to thereby estimate a wide band time response characteristic, and calculate the time period T. The pattern may be registered in a storage device such as a memory built in a computer.

Alternatively, the initial response information extractor 42 may gradually shorten the time period T, and calculate the time period T based on a timing at which the group delay becomes substantially uniform in FIG. 8, for example.

The Fourier transformer 43 performs a Fourier transformation on the initial response information to transform the initial response information from the time domain information to the frequency domain information.

FIG. 11 illustrates initial response information obtained by the transformation performed by the Fourier transformer 43 on the initial response information illustrated in FIG. 10. In FIG. 11, a horizontal axis represents a frequency and a vertical axis represents group delay.

As illustrated in FIG. 11, a variation of the group delay is substantially uniform as compared with FIG. 8. As described above, if no noise or the like is generated, the group delay generally tends to be uniform regardless of frequency. Therefore, it is appreciated that the noise caused by the multipath or the like has been removed.

The distance calculator 50 included in the distance measurement device 1 calculates the distance between the first transceiver 10 and the second transceiver 20 on the basis of the initial response information.

FIG. 12 is a configuration diagram of the distance calculator 50 according to one embodiment. As illustrated in FIG. 12, the distance calculator 50 includes a group delay calculator 51, a frequency selector 52, and a multiplier 53. It is possible to achieve the distance calculator 50 by using, for example, a program.

In FIG. 11, the group delay is substantially uniform. Thus, the group delay appears to be substantially the same regardless of which frequency is selected. Accordingly, the distance may be calculated by multiplying optional group delay by the light velocity.

However, in order to obtain an accurate distance measurement result, it is necessary to select an appropriate frequency and calculate the distance on the basis of group delay related to the frequency. Accordingly, in order to select an appropriate frequency, the group delay calculator 51 calculates a gradient of group delay on the basis of the initial response information.

The gradient of the group delay is a value obtained by differentiating the group delay with respect to the frequency, and refers to a variation of the group delay in a minute frequency interval. A frequency whose gradient of the group delay is small has a small influence of the multipath, and a frequency whose gradient of the group delay is large has a large influence of the multipath. Further, a frequency at which the gradient of the group delay is minimum is a frequency of the radio signal that has reached the receiver first. It is therefore desirable to select a frequency at which the gradient of the group delay is minimum.

FIG. 13 illustrates a calculated gradient of the group delay that is obtained by differentiating, by the group delay calculator 51, the group delay with respect to the frequency on the basis of the initial response information illustrated in FIG. 11. In FIG. 13, a horizontal axis represents a frequency and vertical axis is a gradient of the group delay.

The frequency selector 52 selects a frequency on the basis of the gradient of the group delay. Specifically, the frequency selector 52 selects a frequency at which the gradient of the group delay is minimum. As illustrated in FIG. 13, the gradient of the group delay at a point P in the vicinity of frequency 2.41 [GHz] is the minimum. Thus, the frequency selector 52 selects a frequency F at the point P.

The group delay calculator 51 calculates the group delay at the frequency F by integrating the gradient of the group delay with respect to the frequency.

FIGS. 14 and 15 each illustrate examples of results of group delay calculated by the group delay calculator 51 for respective distances.

As illustrated in FIGS. 14 and 15, the group delay is substantially uniform. As described above, if no noise or the like is generated, the group delay generally tends to be uniform regardless of frequency. Therefore, it is appreciated that the noise caused by the multipath or the like has been removed.

The multiplier 53 calculates the distance by multiplying the group delay at the frequency F by the light velocity.

FIG. 16 illustrates an examples of a result of a distance measurement result obtained by the distance measurement device 1. In FIG. 16, a horizontal axis represents a value obtained by actually measuring the distance between the first transceiver 10 and the second transceiver 20. A vertical axis represents a value obtained by calculating, by the distance measurement device 1, the distance.

A straight line 5 represents a value obtained by actually measuring the distance, which is a correct value. In the straight line 5, the value of the horizontal axis and the value of the vertical axis are the same.

A polygonal line 6 represents a value obtained by calculating, by the distance measurement device 1, the distance. Compared with FIG. 4, the polygonal line 6 and the straight line 5 are nearly overlapping with each other. Therefore, it is appreciated that the distance measurement performance is improved.

The distance measurement device 1 is achieved by utilizing a stand-alone computer such as a PC, a server, a workstation, a tablet terminal, or the like. Alternatively, the distance measurement device 1 is achieved by utilizing a computer system including a plurality of computers cooperating via a network.

The program may be stored in a storage device such as a memory or a hard disk drive built in the computer. An information processing unit such as a CPU built in the computer may operate the program.

The program may be stored in a computer other than the above-mentioned computer or in another computer system. In this case, the computer may use a cloud service that provides functions of the program. Examples of the cloud service include SaaS (Software as a Service), IaaS (Infrastructure as a Service), and PaaS (Platform as a Service).

Further, the program may be stored in a storage medium. That is, the program may be stored in a computer readable form on a storage medium such as a CD-ROM, a DVD, a flash memory, or a hard disk drive. In addition, the configurations described in the above embodiments may be selected or changed as appropriate without departing from the spirit of the present disclosure.

3. Second Embodiment of Present Technology
(Distance Measurement Method)

A distance measurement method according to an embodiment of the present technology will be described. FIG. 17 illustrates an example of a flowchart of the distance measurement method according to an embodiment of the present technology. As illustrated in FIG. 17, the distance measurement method according to an embodiment of the present technology includes: transmitting a pulse signal while performing frequency sweeping (S1); receiving the pulse signal (S2); acquiring a phase difference of the pulse signal (S3); acquiring response information on the basis of the phase difference (S4); extracting, from the response information, initial response information which is the response information related to the first pulse signal to be received at an initial stage (S5); calculating group delay on the basis of the initial response information (S6); and calculating a distance by multiplying the group delay by a light velocity (S7).

The distance measurement method according to an embodiment of the present technology may utilize the technology described in the first embodiment. Accordingly, the technology described in the first embodiment will be omitted here.

First, the pulse signal is transmitted while the frequency sweeping is performed (S1).

Thereafter, the pulse signal is received (S2).

Thereafter, in the acquiring the phase difference of the pulse signal (S3), a phase difference, which is a difference between a phase of the pulse signal based on a timing of transmission and a phase of the pulse signal based on a timing of reception, is acquired.

Thereafter, the response information is acquired on the basis of the phase difference (S4). The response information is information obtained by analyzing the received pulse signal. The response information includes group delay information. Group delay indicates a differential characteristic of a phase at a frequency. The group delay indicates a gradient of the phase with respected to an angular frequency. It is possible to calculate the distance by multiplying the group delay by the light velocity.

Thereafter, the initial response information is extracted from the response information (S5). The initial response information is response information related to the pulse signal that has been received at an initial stage. It is highly probable that the initial response information is not the multipath.

Thereafter, the group delay is calculated on the basis of the initial response information (S6). More specifically, the gradient of the group delay is calculated on the basis of the initial response information.

The gradient of the group delay is a value obtained by differentiating the group delay with respect to the frequency, and refers to a variation of the group delay in a minute frequency interval. A frequency whose gradient of the group delay is small has a small influence of the multipath, and a frequency whose gradient of the group delay is large has a large influence of the multipath. Further, a frequency at which the gradient of the group delay is minimum is a frequency of the radio signal that has reached the receiver first. It is therefore desirable to select a frequency at which the gradient of the group delay is minimum.

Thereafter, a frequency is selected on the basis of the gradient of the group delay. The group delay is selected on the basis of the frequency.

Finally, the distance is calculated by multiplying the group delay at the frequency by the light velocity (S7).

The influence of the multipath is reduced in: the extracting, from the response information, the initial response information which is the response information related to the first pulse signal to be received at the initial stage (S5); and the calculating the group delay on the basis of the initial response information (S6). Thus, the distance measurement performance is improved.

The distance measurement method according to an embodiment of the present technology is achieved by utilizing a stand-alone computer such as a PC, a server, a workstation, a tablet terminal, or the like. Alternatively, the distance measurement device 1 is achieved by utilizing a computer system including a plurality of computers cooperating via a network.

The distance measurement method according to an embodiment of the present technology may be achieved by using, for example, a program or the like. The program may be stored in a storage device such as a memory or a hard disk drive built in the computer. An information processing unit such as a CPU built in the computer may operate the program.

The program may be stored in a computer other than the above-mentioned computer or in another computer system. In this case, the computer may use a cloud service that provides functions of the program. Examples of the cloud service include SaaS (Software as a Service), IaaS (Infrastructure as a Service), and PaaS (Platform as a Service).

Further, the program may be stored in a storage medium. That is, the program may be stored in a computer readable form on a storage medium such as a CD-ROM, a DVD, a flash memory, or a hard disk drive.

In addition, the configurations described in the above embodiments may be selected or changed as appropriate without departing from the spirit of the present disclosure.

It is to be noted that the effects described herein are merely illustrative and not limiting, and other effects may also be exhibited.

It is to be noted that the present technology may have the following configurations.

[1]
A distance measurement device including:
a first transceiver;
a second transceiver;
a response information acquisition section;
a filter; and
a distance calculator, in which
the first transceiver transmits a first pulse signal to the second transceiver while performing frequency sweeping,
the second transceiver receives the first pulse signal transmitted from the first transceiver,
the response information acquisition section acquires response information on a basis of a phase difference obtained by reception of the first pulse signal,
the filter extracts initial response information from the response information, the initial response information being the response information related to the first pulse signal to be received at an initial stage, and
the distance calculator calculates group delay on a basis of the initial response information, and calculates a distance between the first transceiver and the second transceiver by multiplying the group delay by a light velocity.

[2]
The distance measurement device according to [1], in which
the first transceiver transmits the first pulse signal to the second transceiver,
the second transceiver receives the first pulse signal transmitted by the first transceiver, and transmits the second pulse signal to the first transceiver,
the first transceiver receives the second pulse signal transmitted by the second transceiver,
the response information acquisition section acquires the response information on a basis of a phase difference obtained by reception of the first pulse signal and/or the second pulse signal,
the filter extracts initial response information from the response information, the initial response information being the response information related to the first pulse signal and/or the second pulse signal to be received at the initial stage, and
the distance calculator calculates the group delay on the basis of the initial response information, and calculates the distance by multiplying the group delay by the light velocity.

[3]
The distance measurement device according to [2], in which the second transceiver generates the second pulse signal by adding, to the first pulse signal, a difference between a phase of the first pulse signal based on a timing of transmission and a phase of the first pulse signal based on a timing of reception.

[4]
The distance measurement device according to [2] or [3], in which the first pulse signal and the second pulse signal each have a narrow frequency bandwidth.

[5]
The distance measurement device according to any one of [2] to [4], in which the first pulse signal and the second pulse signal each have a frequency bandwidth of lower than or equal to 160 MHz.

[6]
The distance measurement device according to any one of [1] to [5], in which
the filter includes an inverse Fourier transformer, an initial response information extractor, and a Fourier transformer,
the inverse Fourier transformer transforms the response information from frequency domain information to time domain information,
the initial response information extractor extracts the initial response information from the response information that has been transformed to the time domain information, and
the Fourier transformer transforms the initial response information from the time domain information to the frequency domain information.

[7]
The distance measurement device according to any one of [1] to [6], in which the initial response information is the response information related to the first pulse signal and/or the second pulse signal to be received first.

[8]
The distance measurement device according to any one of [1] to [7], in which
the distance calculator includes a group delay calculator, a frequency selector, and a multiplier,
the group delay calculator calculates a gradient of group delay on a basis of the initial response information,
the frequency selector selects a frequency on a basis of the gradient of the group delay, and
the multiplier calculates the distance by multiplying the group delay at the frequency by the light velocity.

[9]
The distance measurement device according to [8], in which the frequency selector selects a frequency at which the gradient of the group delay is minimum.

[10]
A distance measurement method including:
transmitting a pulse signal while performing frequency sweeping;
receiving the pulse signal;
acquiring a phase difference of the pulse signal;
acquiring response information on a basis of the phase difference;
extracting initial response information from the response information, the initial response information being the response information related to the first pulse signal to be received at an initial stage;
calculating group delay on a basis of the initial response information; and
calculating a distance by multiplying the group delay by a light velocity.

REFERENCE SIGNS LIST 1 distance measurement device
10 first transceiver
20 second transceiver
30 response information acquisition section 40 filter
41 inverse Fourier transformer
42 initial response information extractor
43 Fourier transformer
50 distance calculator
51 group delay calculator
52 frequency selector
53 multiplier
61 first pulse signal
62 second pulse signal
S1 transmission of pulse signal
S2 reception of pulse signal
S3 acquisition of phase difference
S4 acquisition of response information
S5 extraction of initial response information
S6 calculation of group delay
S7 calculation of distance

The invention claimed is:

1. A distance measurement device comprising:
a first transceiver;
a second transceiver;
a processor configured to perform a response information acquisition;
a filter; and
a distance calculator, wherein
the first transceiver transmits a first pulse signal to the second transceiver while performing frequency sweeping,
the second transceiver receives the first pulse signal transmitted from the first transceiver,
the response information acquisition acquires response information on a basis of a phase difference obtained by reception of the first pulse signal,
the filter extracts initial response information from the response information, the initial response information being the response information related to the first pulse signal to be received at an initial stage,
the distance calculator calculates group delay on a basis of the initial response information, and calculates a distance between the first transceiver and the second transceiver by multiplying the group delay by a light velocity,
the distance calculator includes a group delay calculator, a frequency selector, and a multiplier,
the group delay calculator calculates a gradient of group delay on a basis of the initial response information,
the frequency selector selects a frequency on a basis of the gradient of the group delay, and
the multiplier calculates the distance by multiplying the group delay at the frequency by the light velocity.

2. The distance measurement device according to claim 1, wherein
the first transceiver transmits the first pulse signal to the second transceiver,
the second transceiver receives the first pulse signal transmitted by the first transceiver, and transmits a second pulse signal to the first transceiver,
the first transceiver receives the second pulse signal transmitted by the second transceiver,
the response information acquisition acquires the response information on a basis of a phase difference obtained by reception of the first pulse signal and/or the second pulse signal, and
the filter extracts initial response information from the response information, the initial response information being the response information related to the first pulse signal and/or the second pulse signal to be received at the initial stage.

3. The distance measurement device according to claim 2, wherein the second transceiver generates the second pulse signal by adding, to the first pulse signal, a difference between a phase of the first pulse signal based on a timing of transmission and a phase of the first pulse signal based on a timing of reception.

4. The distance measurement device according to claim 2, wherein the first pulse signal and the second pulse signal each have a narrow frequency bandwidth.

5. The distance measurement device according to claim 2, wherein the first pulse signal and the second pulse signal each have a frequency bandwidth of lower than or equal to 160 MHz.

6. The distance measurement device according to claim 2, wherein the initial response information is the response information related to the first pulse signal and/or the second pulse signal to be received first.

7. The distance measurement device according to claim 1, wherein
the filter includes an inverse Fourier transformer, an initial response information extractor, and a Fourier transformer,
the inverse Fourier transformer transforms the response information from frequency domain information to time domain information,
the initial response information extractor extracts the initial response information from the response information that has been transformed to the time domain information, and
the Fourier transformer transforms the initial response information from the time domain information to the frequency domain information.

8. The distance measurement device according to claim 1, wherein the frequency selector selects a frequency at which the gradient of the group delay is minimum.

9. A method for distance measurement between a first transceiver and a second transceiver, wherein the first transceiver transmits a first pulse signal to the second transceiver while performing frequency sweeping and the second transceiver receives the first pulse signal transmitted from the first transceiver, the method comprising:
acquiring response information on a basis of a phase difference obtained by reception of the first pulse signal;
extracting initial response information from the response information, the initial response information being the response information related to the first pulse signal to be received at an initial stage;
calculating group delay on a basis of the initial response information;
calculating a distance between the first transceiver and the second transceiver by multiplying the group delay by a light velocity;
calculating a gradient of group delay on a basis of the initial response information; and
selecting a frequency on a basis of the gradient of the group delay, wherein
calculating the distance includes multiplying the group delay at the frequency by the light velocity.

10. A non-transitory computer readable medium storing a program for determining a distance measurement between a first transceiver and a second transceiver, wherein the first transceiver transmits a first pulse signal to the second transceiver while performing frequency sweeping and the second transceiver receives the first pulse signal transmitted from the first transceiver, the program being executable by a processor to perform operations comprising:
- acquiring response information on a basis of a phase difference obtained by reception of the first pulse signal;
- extracting initial response information from the response information, the initial response information being the response information related to the first pulse signal to be received at an initial stage;
- calculating group delay on a basis of the initial response information;
- calculating a distance between the first transceiver and the second transceiver by multiplying the group delay by a light velocity;
- calculating a gradient of group delay on a basis of the initial response information; and
- selecting a frequency on a basis of the gradient of the group delay, wherein
- calculating the distance includes multiplying the group delay at the frequency by the light velocity.

* * * * *